(12) United States Patent
Liang (10) Patent No.: US 12,205,260 B2
(45) Date of Patent: Jan. 21, 2025

(54) IMAGE PROCESSING CIRCUIT AND IMAGE PROCESSING METHOD

(71) Applicant: SigmaStar Technology Ltd., Xiamen (CN)

(72) Inventor: Yu Liang, Shanghai (CN)

(73) Assignee: SIGMASTAR TECHNOLOGY LTD., Xiamen (CN)

(*) Notice: Subject to any disclaimer, the term of this patent is extended or adjusted under 35 U.S.C. 154(b) by 199 days.

(21) Appl. No.: 17/982,546

(22) Filed: Nov. 8, 2022

(65) Prior Publication Data

US 2023/0306567 A1    Sep. 28, 2023

(30) Foreign Application Priority Data

Mar. 28, 2022   (CN) .................. 202210316686.X (51) Int. Cl.
G06T 5/94      (2024.01)
G06T 3/4007    (2024.01)
G06T 5/20      (2006.01)

(52) U.S. Cl.
CPC .............. *G06T 5/94* (2024.01); *G06T 3/4007* (2013.01); *G06T 5/20* (2013.01); *G06T 2207/20016* (2013.01)

(58) Field of Classification Search
CPC .... G06T 5/20; G06T 5/92; G06T 5/94; G06T 3/007; G06T 2207/20016
USPC ...................... 345/617; 382/284; 375/E7.021
See application file for complete search history.

(56) References Cited

U.S. PATENT DOCUMENTS

| | | | |
|---|---|---|---|
| 2012/0076204 A1* | 3/2012 | Raveendran | H04N 21/631 375/E7.021 |
| 2012/0183210 A1* | 7/2012 | Zheng | G06T 5/92 382/284 |
| 2017/0104971 A1* | 4/2017 | Jiang | H04N 9/69 |
| 2019/0356926 A1* | 11/2019 | Tsukagoshi | H04N 19/51 |
| 2024/0005701 A1* | 1/2024 | Liu | G06V 10/764 |
| 2024/0177271 A1* | 5/2024 | Lu | G06T 5/00 |

* cited by examiner

*Primary Examiner* — Prabodh M Dharia
(74) *Attorney, Agent, or Firm* — WPAT, PC (57) ABSTRACT

An image processing method includes the following steps: performing first guided filtering on a target data to generate a first base layer data; generating a first detail layer data according to the target data and the first base layer data; performing second guided filtering on the first base layer data to generate a second base layer data; generating a second detail layer data according to the first base layer data and the second base layer data; converting the target data, the first base layer data or the second base layer data to obtain a converted base layer data; converting the first detail layer data and the second detail layer data to respectively generate a first converted detail layer data and a second converted detail layer data; and adding the converted base layer data and the first and second converted detail layer data to obtain an output data.

14 Claims, 9 Drawing Sheets

IMAGE PROCESSING CIRCUIT AND IMAGE PROCESSING METHOD

BACKGROUND OF THE INVENTION

1. Field of the Invention

The present invention generally relates to image processing, and, more particularly, to circuits and methods of enhancing the contrast of images.

2. Description of Related Art

The conventional image processing circuits and image processing methods generally enhance the contrast of images. However, conventional contrast enhancement methods (e.g., the weighted least squares (WLS)-based algorithm) are so complex that they often render the products uncompetitive. Therefore, there is a need to provide image processing circuits and image processing methods to solve problems in the prior art.

SUMMARY OF THE INVENTION

In view of the issues of the prior art, an object of the present invention is to provide image processing circuits and image processing methods, so as to make an improvement to the prior art.

According to one aspect of the present invention, an image processing circuit is provided. The image processing circuit includes a detail extraction module, a base layer mapping circuit, a detail layer enhancement circuit, and an adder circuit. The detail extraction module includes a first detail layer extraction circuit and a second detail layer extraction circuit. The first detail layer extraction circuit is configured to perform first guided filtering on a target data to generate a first base layer data and generate a first detail layer data according to the target data and the first base layer data. The second detail layer extraction circuit is configured to perform second guided filtering on the first base layer data to generate a second base layer data and generate a second detail layer data according to the first base layer data and the second base layer data. The base layer mapping circuit is configured to convert one of the target data, the first base layer data, and the second base layer data to obtain a converted base layer data. The detail layer enhancement circuit is configured to convert the first detail layer data and the second detail layer data to generate a first converted detail layer data and a second converted detail layer data, respectively. The adder circuit is configured to sum the converted base layer data, the first converted detail layer data, and the second converted detail layer data to obtain an output data.

According to another aspect of the present invention, an image processing method is provided. The image processing method is applied to an image processing device and includes the following steps: performing first guided filtering on a target data to generate a first base layer data; generating a first detail layer data according to the target data and the first base layer data; performing second guided filtering on the first base layer data to generate a second base layer data; generating a second detail layer data according to the first base layer data and the second base layer data; converting one of the target data, the first base layer data, and the second base layer data to obtain a converted base layer data; converting the first detail layer data and the second detail layer data to generate a first converted detail layer data and a second converted detail layer data, respectively; and summing the converted base layer data, the first converted detail layer data, and the second converted detail layer data to obtain an output data.

The technical means embodied in the embodiments of the present invention can solve at least one of the problems of the prior art. Therefore, the present invention is lower in hardware complexity compared with the prior art.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes image processing circuits and image processing methods. On account of that some or all elements of the image processing circuits could be known, the detail of such elements is omitted provided that such detail has little to do with the features of this disclosure, and that this omission nowhere dissatisfies the specification and enablement requirements. The image processing methods can be performed by the image processing circuits or their equivalents. A person having ordinary skill in the art can choose components or steps equivalent to those described in this specification to carry out the present invention, which means that the scope of this invention is not limited to the embodiments in the specification.

Figure 1:
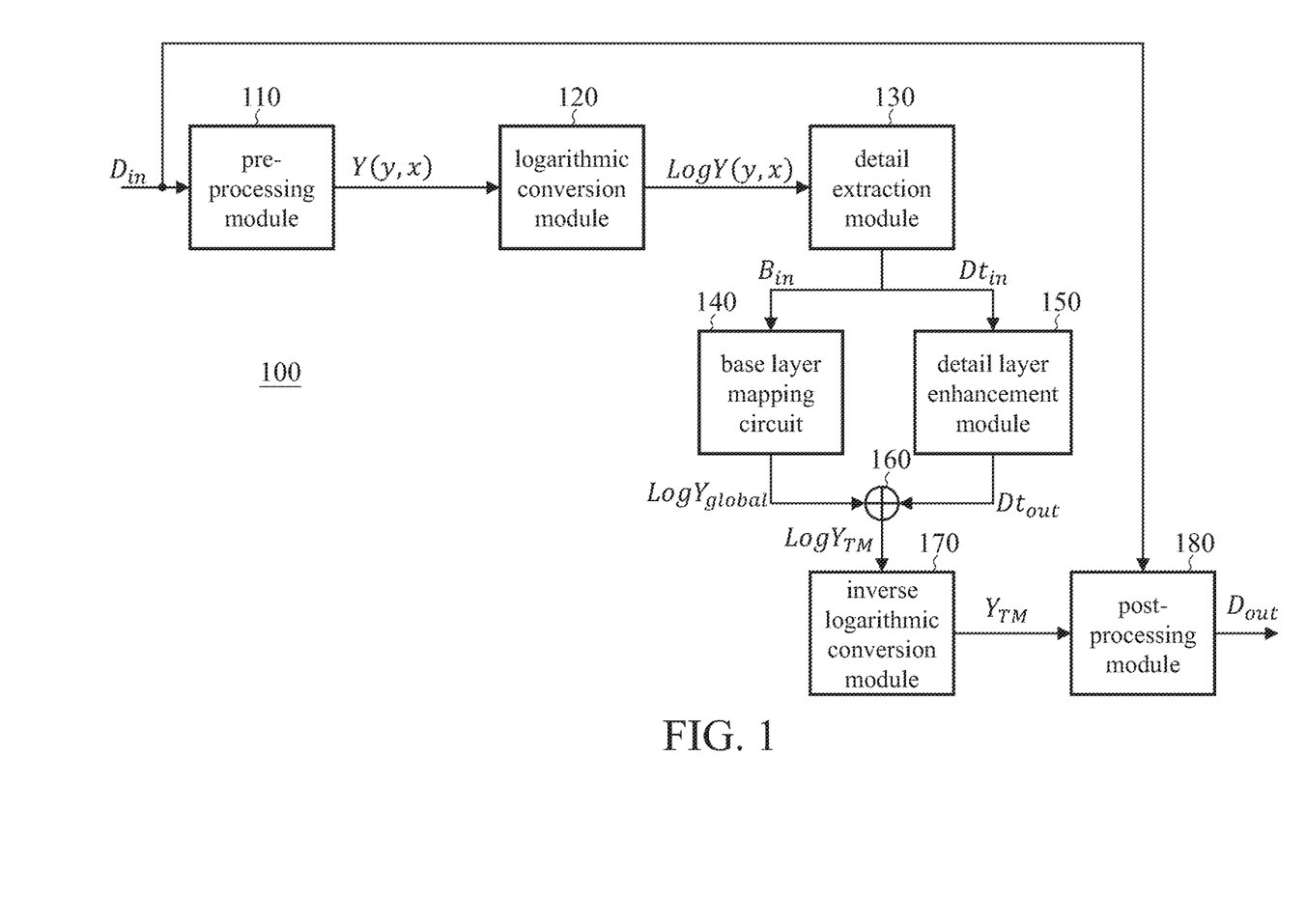
FIG. 1 is a functional block diagram of an image processing circuit according to an embodiment of the present invention.
Figure 2:
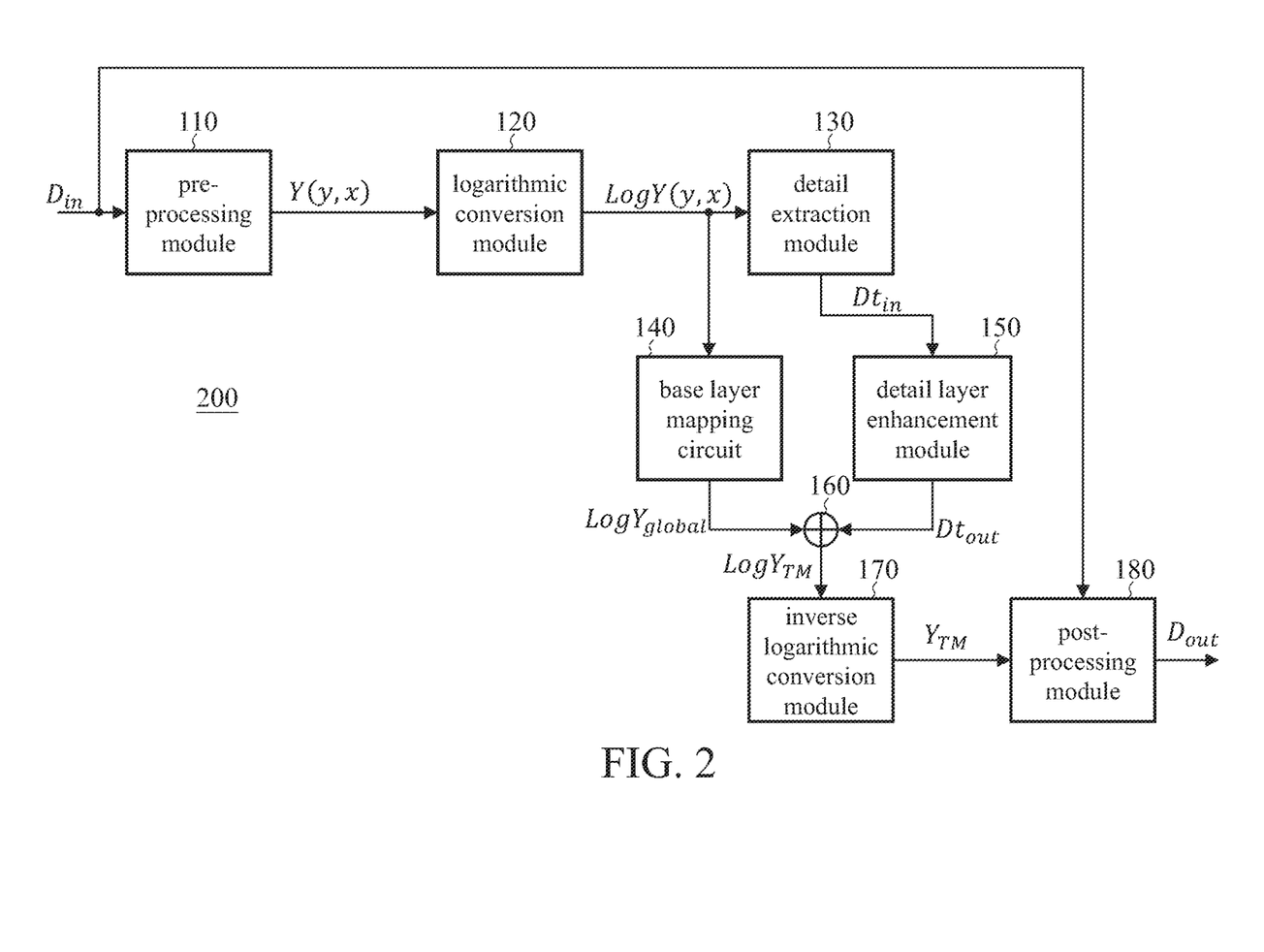
FIG. 2 is a functional block diagram of an image processing circuit according to another embodiment of the present invention.

FIG. 1 is a functional block diagram of an image processing circuit according to an embodiment of the present invention, and FIG. 2 is a functional block diagram of an image processing circuit according to another embodiment of the present invention. FIG. 1 and FIG. 2 are similar, with the difference in the input data of the base layer mapping circuit 140, which will be discussed in detail below.

The image processing circuit 100 and the image processing circuit 200 include a pre-processing module 110, a logarithmic conversion module 120, a detail extraction module 130, a base layer mapping circuit 140, a detail layer enhancement module 150, an adder circuit 160, an inverse logarithmic conversion module 170, and a post-processing module 180.

The pre-processing module 110 converts the input data $D_{in}$ into the luminance data Y(y, x) (e.g., grayscale data). The input data $D_{in}$ can be a raw image file or an image file in the RGB format (hereinafter referred to as an RGB image file). The pre-processing module 110 converts the raw image file into the luminance data Y(y, x) according to equation (1), or converts the RGB image file into the luminance data Y(y, x) according to equation (2).

$$Y(y,x)=\Sigma_{i=-2}^{2}\Sigma_{j=-2}^{2}w(i,j)Raw(y+i,x+j) \quad (1)$$

$$Y(y,x)=0.2R(x,y)+0.7G(x,y)+0.1B(x,y) \quad (2)$$

In equation (1), w(i,j) is the filter coefficient, which may be a coefficient that resembles Gaussian filtering. For example:

$$w = \begin{bmatrix} 0 & 1 & 2 & 1 & 0 \\ 1 & 2 & 4 & 2 & 1 \\ 2 & 4 & 8 & 4 & 2 \\ 1 & 2 & 4 & 2 & 1 \\ 0 & 1 & 2 & 1 & 0 \end{bmatrix}$$

or $$w = \begin{bmatrix} 0 & 0 & 0 & 0 & 0 \\ 0 & 1 & 2 & 1 & 0 \\ 0 & 2 & 4 & 2 & 0 \\ 0 & 1 & 2 & 1 & 0 \\ 0 & 0 & 0 & 0 & 0 \end{bmatrix}.$$

The logarithmic conversion module 120, which maps the luminance data Y(y, x) to the logarithmic domain, aims at mapping the luminance data Y(y, x) to a domain that is consistent with the perception of the human eyes (i.e., to generate the target data Log Y(y, x)). The mapping of the luminance data Y(y, x) to the logarithmic domain can be embodied using equation (3).

$$\text{Log } Y(y,x)=\text{LUT}(Y(y,x)) \quad (3)$$

where LUT( ) is an operation using the lookup table (LUT) (i.e., a table lookup operation). In some embodiments, the table lookup operation of equation (3) may be a logarithmic curve-based table lookup operation, as shown in equation (4).

$$\text{Log } Y(y,x)=\log_2(Y(y,x)+\epsilon) \quad (4)$$

where $\epsilon$ is a small constant that prevents $\log_2(Y(y, x))$ from being a meaningless value (e.g., $-\infty$) when the luminance data Y(y, x) is 0.

The detail extraction module 130 processes the target data Log Y(y, x) to generate at least one base layer and multiple detail layers. The detail extraction module 130 utilizes multi-level guided image filters (GIFs) to divide the target data Log Y(y, x) into multiple detail layers of different sizes. Therefore, the detail layer $Dt_{in}$ outputted by the detail extraction module 130 includes multiple detail layer data, and the base layer $B_{in}$ includes at least one base layer data. The detail extraction module 130 will be discussed in detail below with reference to FIG. 5 and FIG. 6.

Figure 3:
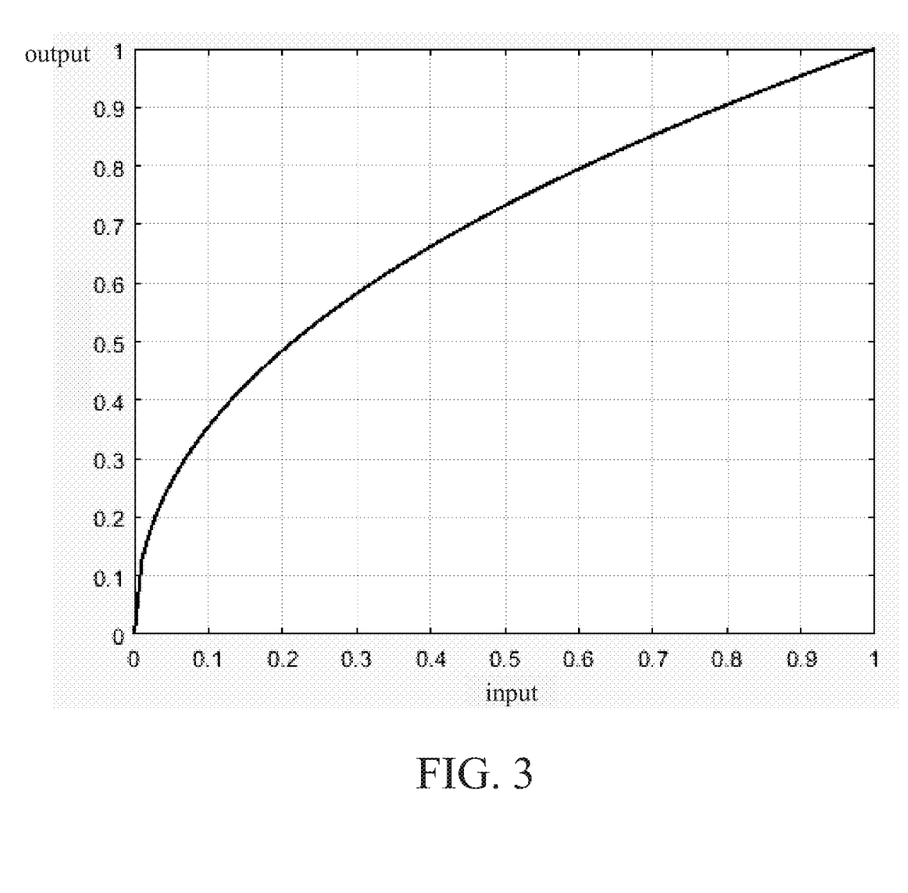
FIG. 3 shows a mapping curve.

The base layer mapping circuit 140 converts the base layer $B_{in}$ (FIG. 1) or the target data LogY(y, x) (FIG. 2) to generate the converted base layer data. In the embodiment of FIG. 2, the base layer mapping circuit 140 uses the target data LogY(y, x) as the base layer. In some embodiments, the base layer mapping circuit 140 performs mapping according to a gamma curve or a gamma-like curve shown in FIG. 3. One purpose of the base layer mapping circuit 140 is to improve the brightness of the base layer.

Figure 4A:
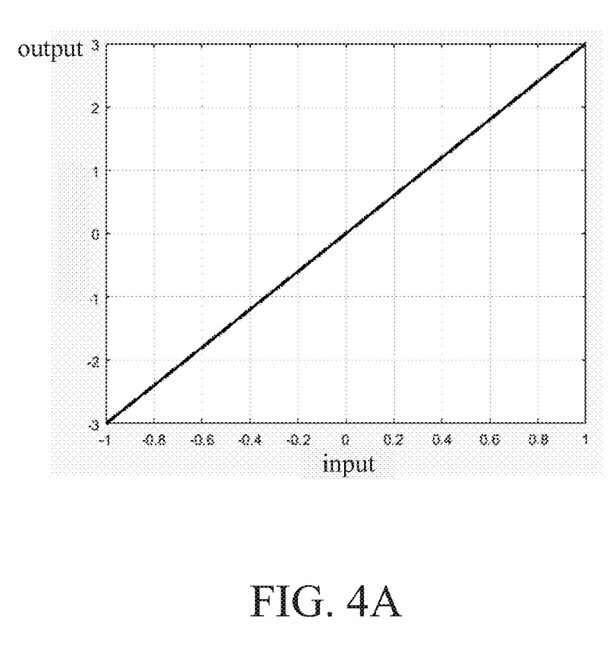
FIG. 4A and FIG. 4B show the mapping curves of linear enhancement and nonlinear enhancement, respectively.
Figure 4B:
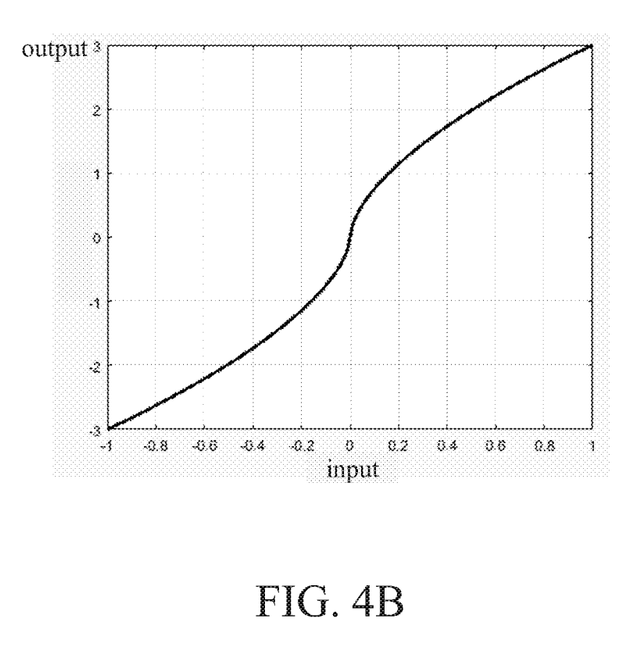

The detail layer enhancement module 150 converts the detail layer data $Dt_{in}$ to generate the converted detail layer data $Dt_{out}$. In some embodiments, the detail layer enhancement module 150 maps the detail layer data $Dt_{in}$ by looking up a table, as in equation (5).

$$Dt_{out}=\text{LUT}_{d1}(Dt_{in}) \quad (5)$$

where the table lookup operation $\text{LUT}_{d1}$( ) can be a linear enhancement operation (FIG. 4A) or a nonlinear enhancement operation (FIG. 4B).

The adder circuit 160 sums the converted base layer data and the converted detail layer data to generate the output data Log $Y_{TM}$.

The inverse logarithmic conversion module 170 performs the inverse logarithmic conversion on the output data Log $Y_{TM}$ to generate the output luminance data $Y_{TM}$. In some embodiments, the inverse logarithmic conversion module 170 operates based on equation (6).

$$Y_{TM}=2^{\text{Log } Y_{TM}}-\epsilon \quad (6)$$

The post-processing module 180 generates the image data $D_{out}$ according to the input data $D_{in}$, the luminance data Y(y, x), and the output luminance data $Y_{TM}$. The image data $D_{out}$ is the outcome of the contrast enhancement of the input data $D_{in}$. In some embodiments, the post-processing module 180 operates based on equation (7) (corresponding to the input data $D_{in}$ being the raw image file) or equation (8) (corresponding to the input data $D_{in}$ being the RGB image file).

$$\text{Raw}_{TM} = \frac{Y_{TM}}{Y} * \text{Raw} \quad (7)$$

$$\begin{cases} R_{TM} = \frac{Y_{TM}}{Y} * R \\ G_{TM} = \frac{Y_{TM}}{Y} * G \\ B_{TM} = \frac{Y_{TM}}{Y} * B \end{cases} \quad (8)$$

In some embodiments, each component in FIG. 1 is embodied by hardware (circuit).

Figure 5:
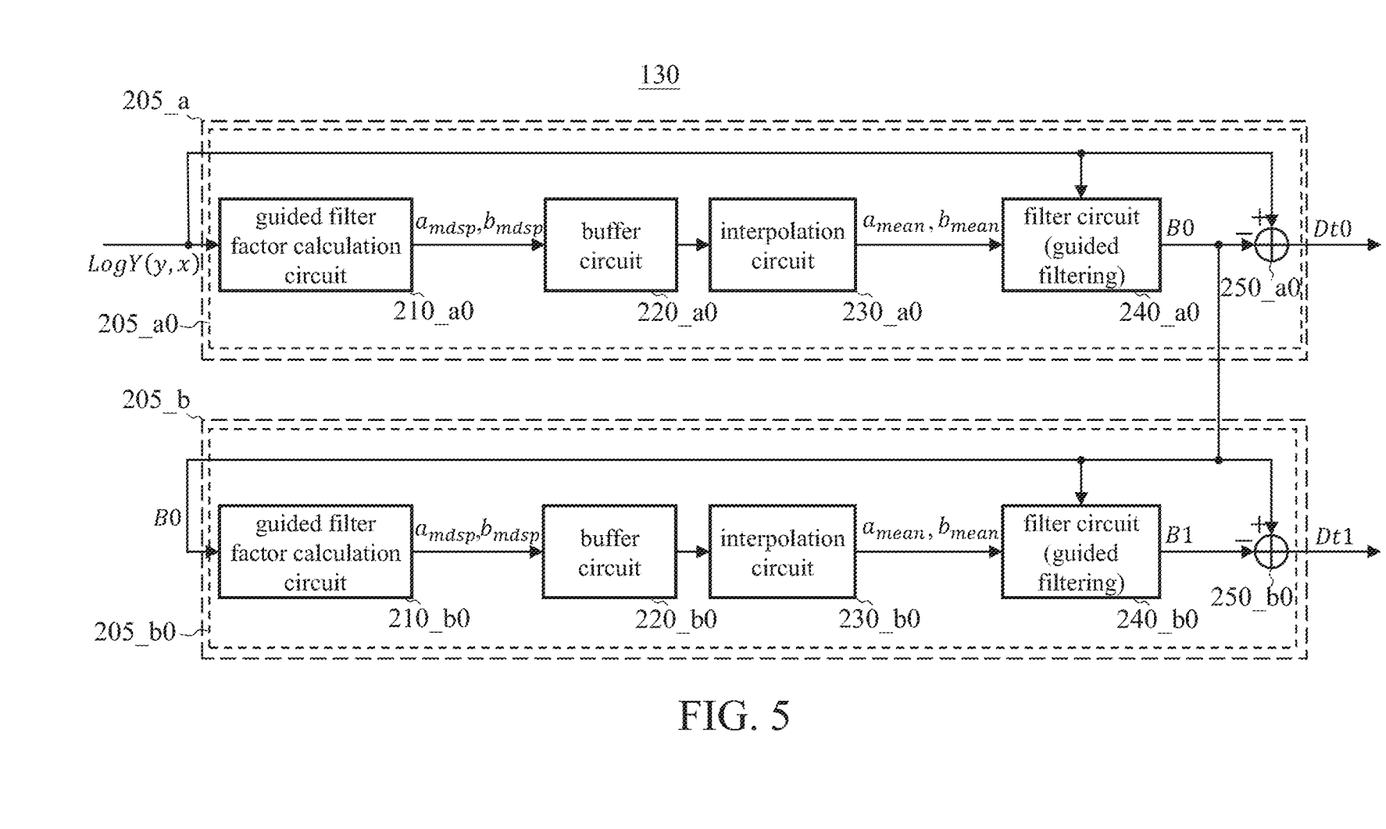
FIG. 5 is a functional block diagram of a detail extraction module according to an embodiment.

FIG. 5 is a functional block diagram of one embodiment of the detail extraction module 130. The detail extraction module 130 includes a first-level detail extraction module 205_a and a second-level detail extraction module 205_b. The first-level detail extraction module 205_a includes a detail layer extraction circuit 205_a0, and the second-level detail extraction module 205_b includes a detail layer extraction circuit 205_b0. The detail layer extraction circuit 205_a0 processes the target data Log Y(y, x) to generate the base layer data B0 and the detail layer data Dt0. The detail layer extraction circuit 205_a0 includes a guided filter factor calculation circuit 210_a0, a buffer circuit 220_a0, an interpolation circuit 230_a0, a filter circuit 240_a0, and an adder circuit 250_a0. The detail layer extraction circuit 205_b0 processes the base layer data B0 to generate the base layer data B1 and the detail layer data Dt1. The detail layer extraction circuit 205_b0 includes a guided filter factor calculation circuit 210_b0, a buffer circuit 220_b0, an interpolation circuit 230_b0, a filter circuit 240_b0, and an adder circuit 250_b0.

The guided filter factor calculation circuit 210_a0 and the guided filter factor calculation circuit 210_b0 perform calculations based on the following equations (9) to (17) to generate the down-sampled guided filter factor $a_{dsp}$ and the down-sampled guided filter factor $b_{dsp}$. For the guided filter factor calculation circuit 210_a0, "Y" in equation (9) is the target data Log Y(y, x). For the guided filter factor calculation circuit 210_b0, "Y" in equation (9) is the base layer data B0.

$$Y_{dsp}(x, y) = \frac{1}{N^2} \sum_{i=0}^{N-1} \sum_{j=0}^{N-1} Y(Nx + i, Ny + j) \quad (9)$$

$$Y_{mean}(x, y) = \sum_{i=-\frac{M-1}{2}}^{\frac{M-1}{2}} \sum_{j=-\frac{M-1}{2}}^{\frac{M-1}{2}} w(i, j) Y_{dsp}(x + i, y + j) \quad (10)$$

$$Y_{mean2}(x, y) = \sum_{i=-\frac{M-1}{2}}^{\frac{M-1}{2}} \sum_{j=-\frac{M-1}{2}}^{\frac{M-1}{2}} w(i, j) Y_{dsp}(x + i, y + j)^2 \quad (11)$$

$$Y_{mean}(x, y) = \frac{1}{M^2} \sum_{i=-\frac{M-1}{2}}^{\frac{M-1}{2}} \sum_{j=-\frac{M-1}{2}}^{\frac{M-1}{2}} Y_{dsp}(x + i, y + j) \quad (12)$$

$$Y_{mean2}(x, y) = \frac{1}{M^2} \sum_{i=-\frac{M-1}{2}}^{\frac{M-1}{2}} \sum_{j=-\frac{M-1}{2}}^{\frac{M-1}{2}} Y_{dsp}(x + i, y + j) \quad (13)$$

$$a_{dsp}(x, y) = \frac{Y_{mean2}(x, y) - Y_{mean}(x, y)^2}{Y_{mean2}(x, y) - Y_{mean}(x, y)^2 + \epsilon} \quad (14)$$

$$b_{dsp}(x, y) = Y_{mean}(x, y) - a Y_{mean}(x, y) \quad (15)$$

$$a_{mdsp}(x, y) = \sum_{i=-\frac{M-1}{2}}^{\frac{M-1}{2}} \sum_{j=-\frac{M-1}{2}}^{\frac{M-1}{2}} w(i, j) a_{dsp}(x + i, y + j) \quad (16)$$

$$b_{mdsp}(x, y) = \sum_{i=-\frac{M-1}{2}}^{\frac{M-1}{2}} \sum_{j=-\frac{M-1}{2}}^{\frac{M-1}{2}} w(i, j) b_{dsp}(x + i, y + j) \quad (17)$$

Equation (9) is to perform down-sampling (down-sampling rate being N) on "Y" by averaging. Equation (10) and equation (11) respectively perform M*M filtering on $Y_{dsp}$(x,y) (i.e., the down-sampled gi) and $Y_{dsp}(x,y)^2$, the value of M being proportional to the size (i.e., the data amount) of w(i,j) in equation (10) and equation (11) is the filter coefficient, which can be the filter coefficient of mean filtering or Gaussian filtering. When w(i,j) is the filter coefficient of the mean filtering $$\left(\text{i.e., } w(i, j) = \frac{1}{M^2}\right),$$

equation (10) and equation (11) become equation (12) and equation (13), respectively. Equation (14) and equation (15) are used to calculate the factors of the GIFs ($a_{dsp}$ and $b_{dsp}$), while equation (16) and equation (17) are used to filter the factors $a_{dsp}$ and $b_{dsp}$, respectively (for mean filtering, $$w(i, j) = \frac{1}{M^2}\right).$$

The buffer circuit 220_a0 and the buffer circuit 220_b0 store the down-sampled guided filter factor $a_{mdsp}$ and the down-sampled guided filter factor $b_{mdsp}$. In some embodiments, if the computation speed of the guided filter factor calculation circuit 210_a0 and the guided filter factor calculation circuit 210_b0 is fast enough, the buffer circuit 220_a0 and the buffer circuit 220_b0 may be omitted.

The interpolation circuit 230_a0 and the interpolation circuit 230_b0 perform calculations based on the following equations (18) to (27) to generate the average guided filter factor $a_{mean}$ and the average guided filter factor $b_{mean}$.

$$x_d = \text{floor}\left(\frac{x}{N}\right) \quad (18)$$

$$y_d = \text{floor}\left(\frac{y}{N}\right) \quad (19)$$

$$x_{off} = \frac{x}{N} - x_d \quad (20)$$

$$y_{off} = \frac{y}{N} - y_d \quad (21)$$

$$a_{y0}(x, y_d) = (1 - x_{off}) a_{mdsp}(x_d, y_d) + x_{off} a_{mdsp}(x_d + 1, y_d) \quad (22)$$

$$a_{y1}(x, y_d) = (1 - x_{off}) a_{mdsp}(x_d, y_d + 1) + x_{off} a_{mdsp}(x_d + 1, y_d + 1) \quad (23)$$

$$b_{y0}(x, y_d) = (1 - x_{off}) b_{mdsp}(x_d, y_d) + x_{off} b_{mdsp}(x_d + 1, y_d) \quad (24)$$

$$b_{y1}(x, y_d) = (1 - x_{off}) b_{mdsp}(x_d, y_d + 1) + x_{off} b_{mdsp}(x_d + 1, y_d + 1) \quad (25)$$

$$a_{mean}(x, y) = (1 - y_{off}) a_{y0}(x, y_d) + y_{off} a_{y1}(x, y_d + 1) \quad (26)$$

$$b_{mean}(x, y) = (1 - y_{off}) b_{y0}(x, y_d) + y_{off} b_{y1}(x, y_d + 1) \quad (27)$$

Equations (18) to (21) are provided for the up-sampling operation, equations (22) to (25) are provided for the interpolation operation in the X direction, and equations (26) to (27) are provided for the interpolation operation in the Y direction. Therefore, the interpolation circuit 230_a0 and the interpolation circuit 230_b0 can also be referred to as the bilinear interpolation circuits.

The filter circuit 240_a0 and the filter circuit 240_b0 perform guided filtering based on the following equation (28) to generate the base layer data B0 and the base layer data B1, respectively. The base layer data B0 and the base layer data B1 are respectively the result ($Y_{gif}(x,y)$) of guided filtering of the target data Log Y(y, x) and guided filtering of the base layer data B0.

$$Y_{gif}(x,y) = a_{mean}(x,y) Y(x,y) + b_{mean}(x, Y) \quad (28)$$

The output of the adder circuit 250_a0 is Dt0=Log Y(y, x)−B0, and the output of the adder circuit 250_b0 is Dt1=B0−B1.

In some embodiments, the first-level detail extraction module 205_a uses a filter with a smaller size (i.e., the down-sampling rate N of equation (9) being larger), and the second-level detail extraction module 205_b uses a filter with a larger size (i.e., the down-sampling rate N of equation (9) being smaller). In such a design, the base layer data B0 is the low-medium frequency detail of the target data Log Y(y, x), the detail layer data Dt0 is the high-frequency detail of the target data Log Y(y, x), the base layer data B1 is the low-frequency detail of the target data Log Y(y, x), and the detail layer data Dt1 is the intermediate-frequency (IF) detail of the target data Log Y(y, x). In this way, the detail extraction module 130 can extract the details of the different frequency components of the target data Log Y(y, x).

For the embodiment of FIG. 1, the output of the detail extraction module 130 includes the base layer $B_{in}$ and the detail layer $Dt_{in}$. The base layer $B_{in}$ includes at least one of the base layer data B0 and the base layer data B1 (which is/are used as the input of the base layer mapping circuit 140), and the detail layer $Dt_{in}$ includes the detail layer data Dt0 and the detail layer data Dt1. For the embodiment of FIG. 2, the output of the detail extraction module 130 is the detail layer $Dt_{in}$, which includes the detail layer data Dt0 and the detail layer data Dt1.

Figure 6:
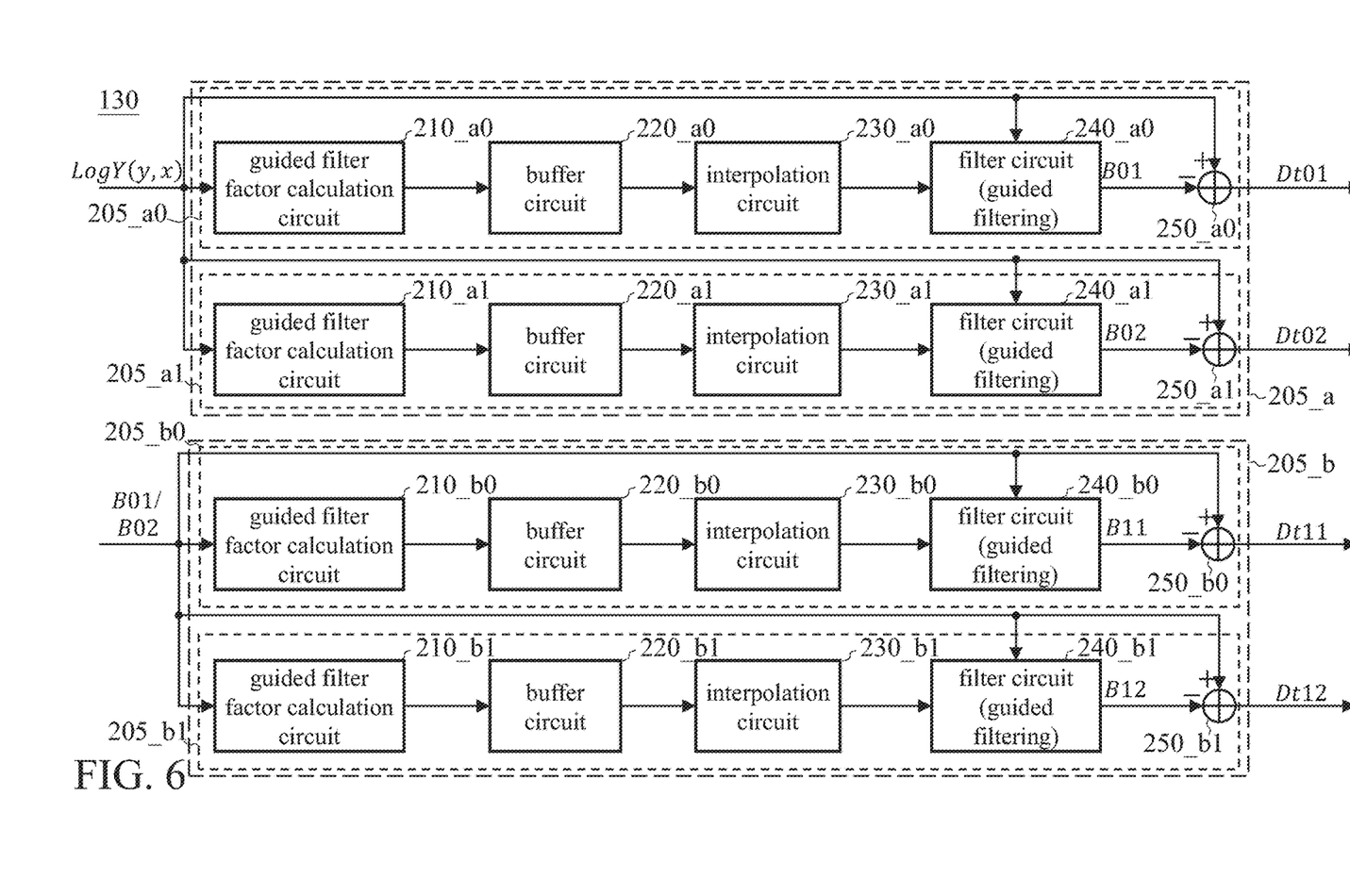
FIG. 6 is a functional block diagram of a detail extraction module according to another embodiment.

FIG. 6 is a functional block diagram of the detail extraction module 130 according to another embodiment. The detail extraction module 130 includes a first-level detail extraction module 205_a and a second-level detail extraction module 205_b. The first-level detail extraction module 205_a includes a detail layer extraction circuit 205_a0 and a detail layer extraction circuit 205_a1. The second-level detail extraction module 205_b includes a detail layer extraction circuit 205_b0 and a detail layer extraction circuit 205_b1. The detail layer extraction circuit 205_a0 processes the target data Log Y(y, x) to generate the base layer data B01 and the detail layer data Dt01. The detail layer extraction circuit 205_a1 processes the target data Log Y(y, x) to generate the base layer data B02 and the detail layer data Dt02. The detail layer extraction circuit 205_b0 processes the base layer data B01 or the base layer data B02 to generate the base layer data B11 and the detail layer data Dt11. The detail layer extraction circuit 205_b1 processes the base layer data B01 or the base layer data B02 to generate the base layer data B12 and the detail layer data Dt12.

The structure and operating principle of the detail layer extraction circuit 205_a0 and the detail layer extraction circuit 205_b0 in FIG. 6 are respectively the same as those of the detail layer extraction circuit 205_a0 and the detail layer extraction circuit 205_b0 in FIG. 5. The detail layer extraction circuit 205_a1 includes a guided filter factor calculation circuit 210_a1, a buffer circuit 220_a1, an interpolation circuit 230_a1, a filter circuit 240_a1, and an adder circuit 250_a1. The detail layer extraction circuit 205_b1 includes a guided filter factor calculation circuit 210_b1, a buffer circuit 220_b1, an interpolation circuit 230_b1, a filter circuit 240_b1, and an adder circuit 250_b1. The operating principles of the detail layer extraction circuit 205_a1 and the detail layer extraction circuit 205_b1 are respectively the same as those of the detail layer extraction circuit 205_a0 and the detail layer extraction circuit 205_b0 and thus omitted herein for brevity. Likewise, in some embodiments, the buffer circuit 220_a1 and the buffer circuit 220_b1 may be omitted.

Similarly, in some embodiments, the sizes (or the down-sampling rate N) of the filters of both the detail layer extraction circuit 205_a0 and the detail layer extraction circuit 205_a1 are smaller (or greater) than the sizes (or the down-sampling rate N) of the filters of both detail layer extraction circuit 205_b0 and detail layer extraction circuit 205_b1. In such a design, the base layer data B01 and the base layer data B02 are the IF and low-frequency details of the target data Log Y(y, x), the detail layer data Dt01 and the detail layer data Dt02 are the high-frequency details of the target data Log Y(y, x), the base layer data B11 and the base layer data B12 are the low-frequency details of the target data Log Y(y, x), and the detail layer data Dt11 and the detail layer data Dt12 are the IF details of the target data Log Y(y, x). In this way, the detail extraction module 130 can extract the details of the different frequency components of the target data Log Y(y, x).

In some embodiments, the size (or the down-sampling rate N) of the filter of the detail layer extraction circuit 205_a0 is different from the size of the filter of the detail layer extraction circuit 205_a1; the size (or the down-sampling rate N) of the filter of the detail layer extraction circuit 205_b0 is different from the size of the filter of the detail layer extraction circuit 205_b1.

For the embodiment of FIG. 1, the detail extraction module 130 outputs the base layer $B_{in}$ and the detail layer $Dt_{in}$. The base layer $B_{in}$ includes at least one of the base layer data B01, the base layer data B02, the base layer data B11, and the base layer data B12 (which is/are used as the input of the base layer mapping circuit 140), and the detail layer $Dt_{in}$ includes the detail layer data Dt01, the detail layer data Dt02, the detail layer data Dt11, and the detail layer data Dt12. For the embodiment of FIG. 2, the output of the detail extraction module 130 is the detail layer $Dt_{in}$, which includes the detail layer data Dt01, the detail layer data Dt02, the detail layer data Dt11, and the detail layer data Dt12.

In some embodiments, the detail layer extraction circuit 205_a1 of FIG. 6 can be omitted.

In other embodiments, the detail layer extraction circuit 205_b1 of FIG. 6 can be omitted.

Based on the embodiments of FIG. 5 and FIG. 6, people having ordinary skill in the art can scale up the levels of the detail extraction module 130 to more than three, and each level includes at least one detail layer extraction circuit.

The base layer mapping circuit 140 generates the converted base layer data (i.e., $LogY_{global}$) based on equation (29).

$$Log\ Y_{global} = LUT_{global}(X) \qquad (29)$$

For the embodiment of FIG. 1, the input "X" is one of the base layer data B0 and the base layer data B1 (corresponding to the embodiment of FIG. 5), or one of the base layer data B01, the base layer data B02, the base layer data B11, and the base layer data B12 (corresponding to the embodiment of FIG. 6). For the embodiment of FIG. 2, the input "X" is the target data Log Y(y, x). The table lookup operation $LUT_{global}(\ )$ may correspond to the curve in FIG. 3.

Figure 7:
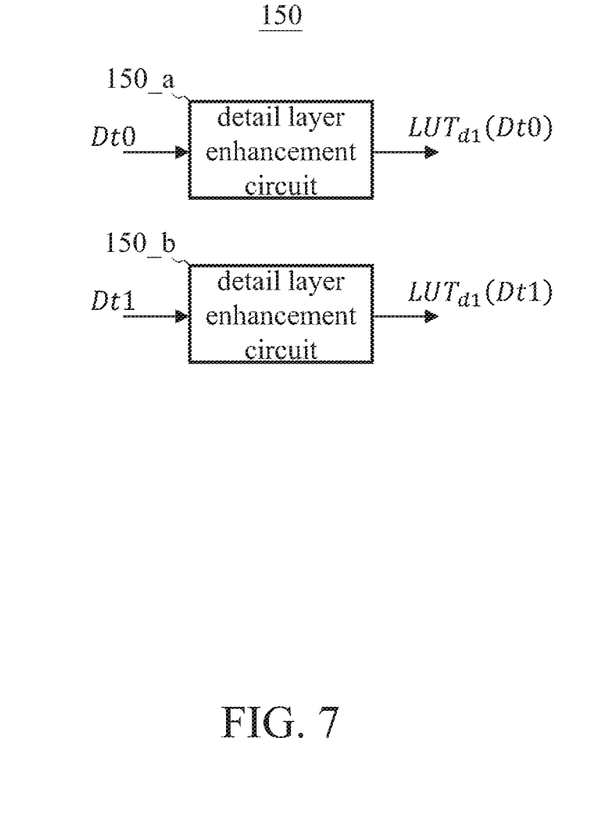
FIG. 7 and FIG. 8 show functional block diagrams of the detail layer enhancement module according to different embodiments.
Figure 8:
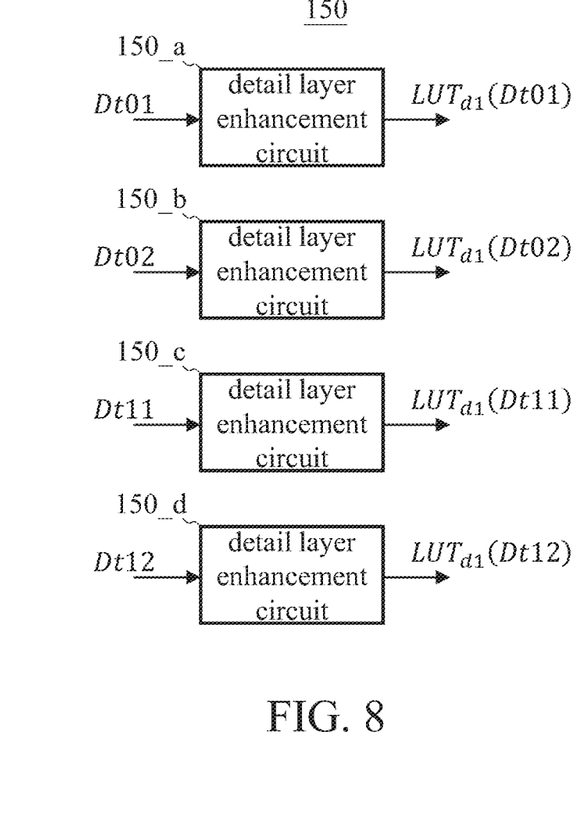

FIG. 7 and FIG. 8 each show the functional block diagram of the detail layer enhancement module 150 according to different embodiments. FIG. 7 corresponds to the embodiment of FIG. 5, and FIG. 8 corresponds to the embodiment of FIG. 6. In the embodiment of FIG. 7, the detail layer enhancement module 150 includes a detail layer enhancement circuit 150_a and a detail layer enhancement circuit 150_b. In the embodiment of FIG. 8, the detail layer enhancement module 150 further includes a detail layer enhancement circuit 150_c and a detail layer enhancement circuit 150_d. The detail layer enhancement circuits 150a, 150_b, 150c, and 150_d output the converted detail layer data based on equation (5). As shown in FIG. 7 and FIG. 8, $LUT_{d1}(Dt0)$, $LUT_{d1}(Dt1)$, $LUT_{d1}(Dt01)$, $LUT_{d1}(Dt02)$, $LUT_{d1}(Dt11)$, and $LUT_{d1}(Dt12)$ correspond to Dt0, Dt1, Dt01, Dt02, Dt11, and Dt12, respectively.

For the embodiments of FIG. 5 and FIG. 7, the output data Log $Y_{TM}$ in FIG. 1 and FIG. 2 is Log $Y_{global}$+$LUT_{d1}$(Dt0)+$LUT_{d1}$(Dt1). For the embodiments of FIG. 6 and FIG. 8, the output data Log $Y_{TM}$ in FIG. 1 and FIG. 2 is Log $Y_{global}$+$LUT_{d1}$(Dt01)+$LUT_{d1}$(Dt02)+$LUT_{d1}$(Dt11)+$LUT_{d1}$(Dt12).

To sum up, the image processing circuit 100 of the present invention enhances the detail layers of different frequencies of the image separately, so that a better image contrast enhancement effect can be achieved with lower hardware complexity.

Figure 9:
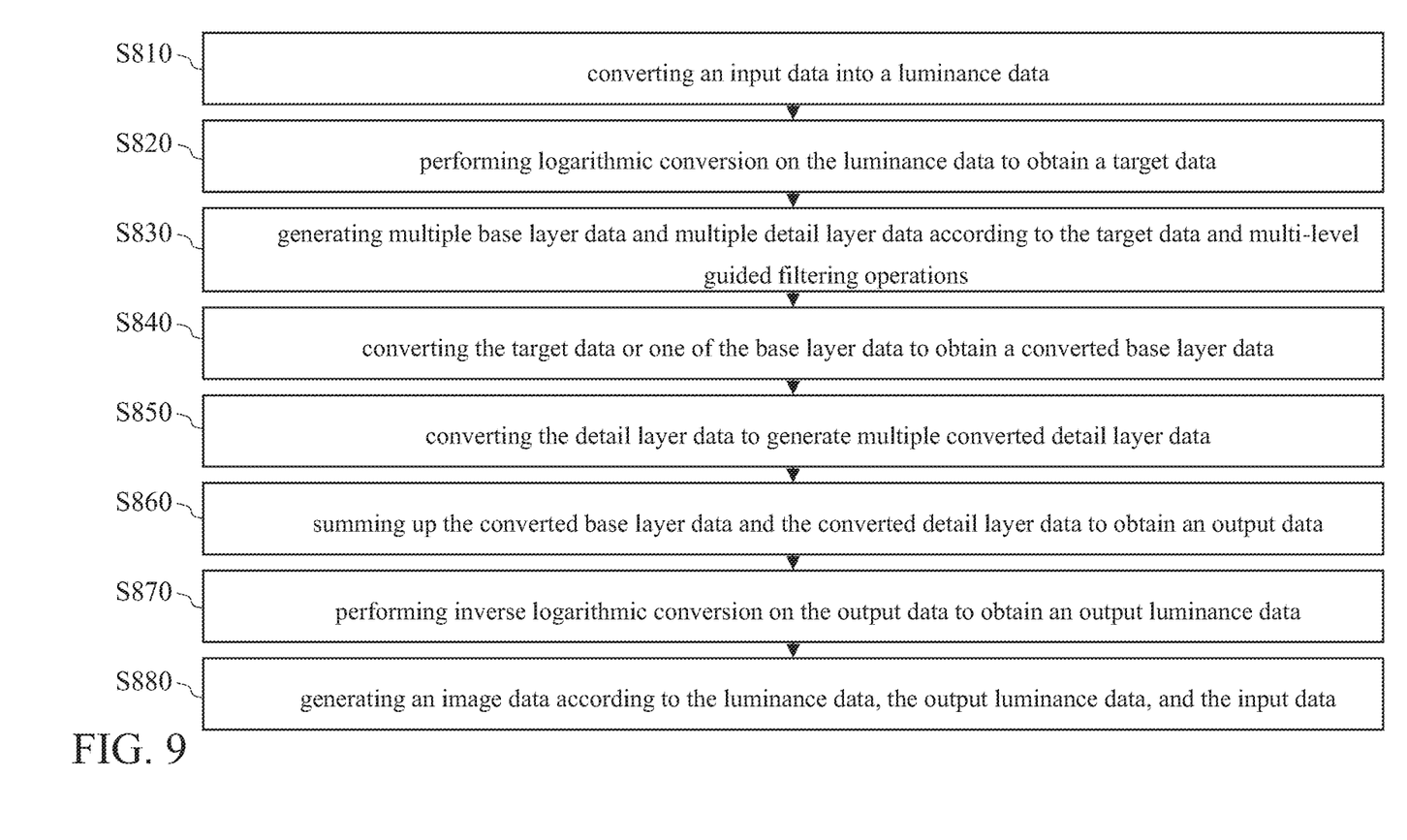
FIG. 9 and FIG. 10 are flowcharts of image processing methods according to an embodiment of the present invention.
Figure 10:
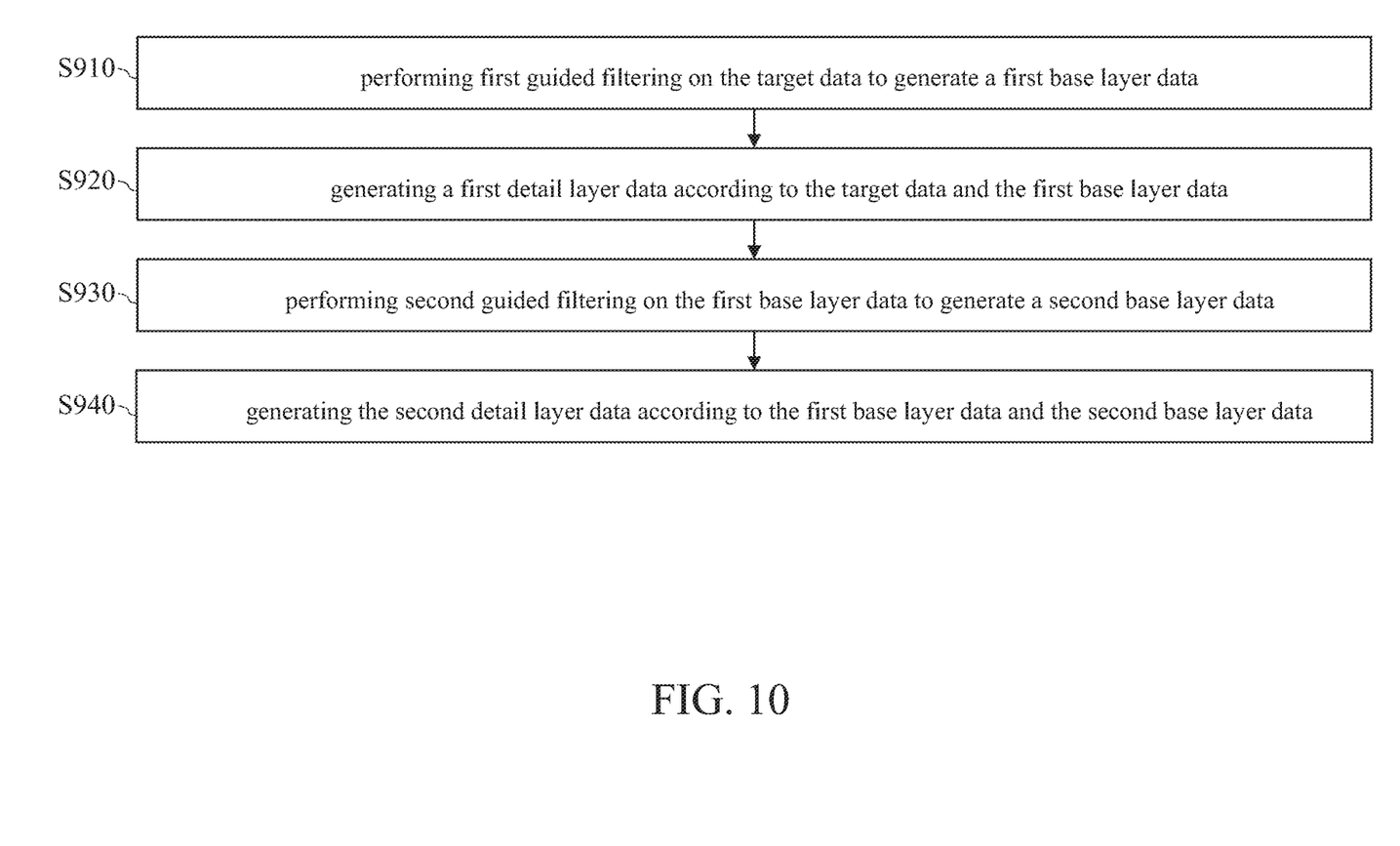

In addition to the aforementioned image processing circuit, the present invention also discloses a corresponding image processing method, which can be applied to an image processing device. The method is performed by the above-discussed image processing circuit 100, image processing circuit 200, or their equivalents. FIG. 9 and FIG. 10 are the flowcharts of one embodiment of the method, including the following steps.

Step S810: Converting the input data $D_{in}$ into the luminance data Y(y, x). This step corresponds to the pre-processing module 110 and equation (1) or equation (2).

Step S820: Performing logarithmic conversion on the luminance data Y(y, x) to obtain the target data Log Y(y, x). This step corresponds to the logarithmic conversion module 120 and equation (3) or (4).

Step S830: Generating multiple base layer data (e.g., the base layer data B0 and base layer data B1 in FIG. 5, or the base layer data B01, base layer data B02, base layer data B11, and base layer data B12 in FIG. 6) and multiple detail layer data (e.g., the detail layer data Dt0 and detail layer data Dt1 in FIG. 5, or the detail layer data Dt01, detail layer data Dt02, detail layer data Dt11, and detail layer data Dt12 in FIG. 6) according to the target data Log Y(y, x) and multi-level guided filtering operations. This step corresponds to the detail extraction module 130 and equations (9) to (28).

Step S840: Converting the target data LogY(y, x) or one of the base layer data to obtain a converted base layer data. This step corresponds to the base layer mapping circuit 140 and equation (29).

Step S850: Converting the detail layer data to generate multiple converted detail layer data. This step corresponds to the detail layer enhancement module 150 and equation (5).

Step S860: Summing up the converted base layer data and the converted detail layer data to obtain the output data Log $Y_{TM}$. This step corresponds to the adder circuit 160.

Step S870: Performing inverse logarithmic conversion on the output data Log $Y_{TM}$ to obtain the output luminance data $Y_{TM}$. This step corresponds to the inverse logarithmic conversion module 170 and equation (6).

Step S880: Generating the image data $D_{out}$ according to the luminance data Y(y, x), the output luminance data $Y_{TM}$, and the input data $D_{in}$. This step corresponds to the post-processing module 180 and equation (7) or (8).

FIG. 10 shows the sub-steps of step S830, including steps S910 to S940.

Step S910: Performing first guided filtering on the target data Log Y(y, x) to generate the first base layer data (the base layer data B0 or base layer data B01). This step may correspond to the guided filter factor calculation circuit 210_a0, the interpolation circuit 230_a0, and the filter circuit 240_a0 of the detail layer extraction circuit 205_a0 in FIG. 5 or FIG. 6.

Step S920: Generating the first detail layer data (the detail layer data Dt0 or detail layer data Dt01) according to the target data Log Y(y, x) and the first base layer data. This step may correspond to the adder circuit 250_a0 of the detail layer extraction circuit 205_a0 in FIG. 5 or FIG. 6.

Step S930: Performing second guided filtering on the first base layer data to generate the second base layer data (the base layer data B1 or base layer data B11). This step may correspond to the guided filter factor calculation circuit 210_b0, the interpolation circuit 230_b0, and the filter circuit 240_b0 of the detail layer extraction circuit 205_b0 in FIG. 5 or FIG. 6.

Step S940: Generating the second detail layer data (the detail layer data Dt1 or detail layer data Dt11) according to the first base layer data and the second base layer data. This step may correspond to the adder circuit 250_b0 of the detail layer extraction circuit 205_b0 in FIG. 5 or FIG. 6.

Note that people having ordinary skill in the art can perform operations corresponding to FIG. 6 according to the steps of FIG. 10. For example, people having ordinary skill in the art can selectively (1) perform steps S910 and S920 again to implement the operations of the detail layer extraction circuit 205_a1 to generate the third base layer data (the base layer data B02) and the third detail layer data (the detail layer data Dt02), or (2) perform step S930 and step S940 again to implement the operations of the detail layer extraction circuit 205_b1 to generate the third base layer data (the base layer data B12) and the third detail layer data (the detail layer data Dt12), or (3) perform steps S910 to S940 again to implement the operations of the detail layer extraction circuit 205_a1 and the detail layer extraction circuit 205_b1 to generate the third base layer data (the base layer data B02), the fourth base layer data (the base layer data B12), the third detail layer data (the detail layer data Dt02), and the fourth detail layer data (the detail layer data Dt12).

Various functional components or blocks have been described herein. As appreciated by persons skilled in the art, in some embodiments, the functional blocks can preferably be implemented through circuits (either dedicated circuits, or general purpose circuits, which operate under the control of one or more processors and coded instructions), which typically comprise transistors or other circuit elements that are configured in such a way as to control the operation of the circuitry in accordance with the functions and operations described herein. As further appreciated by persons skilled in the art, the specific structure or interconnections of the circuit elements can typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:
1. An image processing circuit, comprising:
 a detail extraction module comprising:
  a first detail layer extraction circuit configured to perform first guided filtering on a target data to generate a first base layer data and generate a first detail layer data according to the target data and the first base layer data; and
  a second detail layer extraction circuit configured to perform second guided filtering on the first base layer data to generate a second base layer data and generate a second detail layer data according to the first base layer data and the second base layer data;
 a base layer mapping circuit configured to convert one of the target data, the first base layer data, and the second base layer data to obtain a converted base layer data;
 a detail layer enhancement circuit configured to convert the first detail layer data and the second detail layer data to generate a first converted detail layer data and a second converted detail layer data, respectively; and
 an adder circuit configured to sum the converted base layer data, the first converted detail layer data, and the second converted detail layer data to obtain an output data.

2. The image processing circuit of claim 1, wherein a first down-sampling rate of the first guided filtering is greater than a second down-sampling rate of the second guided filtering.

3. The image processing circuit of claim 2, wherein the detail extraction module further comprises a third detail layer extraction circuit configured to perform third guided filtering on the first base layer data to generate a third base layer data;
wherein the first down-sampling rate of the first guided filtering is greater than a third down-sampling rate of the third guided filtering.

4. The image processing circuit of claim 3, wherein the detail extraction module further comprises a fourth detail layer extraction circuit configured to perform fourth guided filtering on the target data to generate a fourth base layer data;
wherein a fourth down-sampling rate of the fourth guided filtering is greater than the second down-sampling rate and the third down-sampling rate.

5. The image processing circuit of claim 2, wherein the detail extraction module further comprises a third detail layer extraction circuit configured to perform third guided filtering on the target data to generate a third base layer data;
wherein a third down-sampling rate of the third guided filtering is greater than the second down-sampling rate.

6. The image processing circuit of claim 2, wherein the first detail layer extraction circuit comprises:
a guided filter factor calculation circuit configured to perform calculation on the target data according to the first down-sampling rate to obtain a first filter factor and a second filter factor;
an interpolation circuit configured to perform an up-sampling operation on the first filter factor and the second filter factor based on an interpolation method to generate a first average guided filter factor and a second average guided filter factor; and
a filter circuit configured to filter the target data according to the first average guided filter factor and the second average guided filter factor to obtain the first base layer data.

7. The image processing circuit of claim 2 further comprising:
a pre-processing circuit configured to convert an input data into a luminance data;
a logarithmic conversion circuit configured to perform logarithmic conversion on the luminance data to obtain the target data;
an inverse logarithmic conversion circuit configured to perform inverse logarithmic conversion on the output data to obtain an output luminance data; and
a post-processing circuit configured to generate an image data according to the luminance data, the output luminance data, and the input data.

8. An image processing method applied to an image processing device, comprising:
performing first guided filtering on a target data to generate a first base layer data;
generating a first detail layer data according to the target data and the first base layer data;
performing second guided filtering on the first base layer data to generate a second base layer data;
generating a second detail layer data according to the first base layer data and the second base layer data;
converting one of the target data, the first base layer data, and the second base layer data to obtain a converted base layer data;
converting the first detail layer data and the second detail layer data to generate a first converted detail layer data and a second converted detail layer data, respectively; and
summing the converted base layer data, the first converted detail layer data, and the second converted detail layer data to obtain an output data.

9. The image processing method of claim 8, wherein a first down-sampling rate of the first guided filtering is greater than a second down-sampling rate of the second guided filtering.

10. The image processing method of claim 9 further comprising:
performing third guided filtering on the first base layer data to generate a third base layer data;
wherein the first down-sampling rate of the first guided filtering is greater than a third down-sampling rate of the third guided filtering.

11. The image processing method of claim 10 further comprising:
performing fourth guided filtering on the target data to generate a fourth base layer data;
wherein a fourth down-sampling rate of the fourth guided filtering is greater than the second down-sampling rate and the third down-sampling rate.

12. The image processing method of claim 9 further comprising:
performing third guided filtering on the target data to generate a third base layer data;
wherein a third down-sampling rate of the third guided filtering is greater than the second down-sampling rate.

13. The image processing method of claim 9, wherein the operation of generating the first base layer data comprises:
performing calculation on the target data according to the first down-sampling rate to obtain a first filter factor and a second filter factor;
performing an up-sampling operation on the first filter factor and the second filter factor based on an interpolation method to generate a first average guided filter factor and a second average guided filter factor; and
filtering the target data according to the first average guided filter factor and the second average guided filter factor to obtain the first base layer data.

14. The image processing method of claim 9 further comprising:
converting an input data into a luminance data;
performing logarithmic conversion on the luminance data to obtain the target data;
performing inverse logarithmic conversion on the output data to obtain an output luminance data; and
generating an image data according to the luminance data, the output luminance data, and the input data.

* * * * *